(12) United States Patent
Duron (10) Patent No.: US 9,158,945 B2
(45) Date of Patent: Oct. 13, 2015

(54) DEFINING A RADIO FREQUENCY IDENTIFICATION READ AREA

(71) Applicant: Symbol Technologies, Inc., Schaumburg, IL (US)

(72) Inventor: Mark Duron, East Patchogue, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 9 days.

(21) Appl. No.: 13/865,408

(22) Filed: Apr. 18, 2013

(65) Prior Publication Data

US 2014/0313015 A1    Oct. 23, 2014

(51) Int. Cl.
*H04Q 5/22* (2006.01)
*G06K 7/00* (2006.01)
*G06K 7/10* (2006.01)

(52) U.S. Cl.
CPC .......... *G06K 7/0008* (2013.01); *G06K 7/10425* (2013.01); *G06K 7/10475* (2013.01)

(58) Field of Classification Search
CPC ............ H04Q 5/22; G08B 13/14; G08B 1/08; G06K 7/0008; G06K 7/10425; G06K 7/10475
USPC ............. 340/10.3, 10.1, 10.2, 539.1, 539.23, 340/572.1
See application file for complete search history.

(56) References Cited

U.S. PATENT DOCUMENTS

| | | | | |
|---|---|---|---|---|
| 5,530,702 A * | 6/1996 | Palmer et al. | ................. | 370/445 |
| 5,745,036 A * | 4/1998 | Clare | ......................... | 340/572.1 |
| 5,920,261 A * | 7/1999 | Hughes et al. | ............. | 340/568.8 |
| 7,239,228 B2 * | 7/2007 | Kim et al. | ..................... | 340/10.2 |
| 7,986,235 B2 * | 7/2011 | Posamentier | ............... | 340/572.1 |
| 8,006,904 B2 * | 8/2011 | Salim et al. | ..................... | 235/385 |
| 8,212,678 B2 * | 7/2012 | Scherabon | ................. | 340/572.7 |
| 8,487,747 B2 * | 7/2013 | Morin | ......................... | 340/10.2 |
| 2002/0075152 A1 * | 6/2002 | Nysen | ......................... | 340/573.1 |
| 2003/0231105 A1 * | 12/2003 | Kim et al. | ..................... | 340/10.2 |
| 2005/0212673 A1 * | 9/2005 | Forster | ....................... | 340/572.7 |
| 2006/0086790 A1 | 4/2006 | Sloan et al. | | |
| 2006/0215026 A1 * | 9/2006 | Kamata et al. | ................ | 348/143 |
| 2007/0046434 A1 * | 3/2007 | Chakraborty | ................ | 340/10.1 |
| 2007/0139163 A1 * | 6/2007 | Powell et al. | ................ | 340/10.2 |
| 2007/0164850 A1 * | 7/2007 | Spindler et al. | ............. | 340/10.2 |
| 2007/0194931 A1 | 8/2007 | Miller et al. | | |
| 2008/0040246 A1 * | 2/2008 | Fukamachi | ..................... | 705/29 |
| 2008/0111662 A1 * | 5/2008 | Sakama et al. | ............... | 340/10.1 |
| 2008/0116273 A1 | 5/2008 | Aldridge | | |

(Continued)

FOREIGN PATENT DOCUMENTS

DE    102008040453 A1    3/2009
EP    2490150 A1    8/2012

OTHER PUBLICATIONS

International Search Report and Written Opinion mailed Jul. 1, 2014 in counterpart PCT application PCY/US2014/031899.

*Primary Examiner* — Quang D Pham (57) ABSTRACT

Defining a radio frequency identification read area includes a radio frequency identification (RFID) reader operable to read RFID tags within a specified read area. An RFID transmitter is coupled with the RFID reader and is operable to radiating a modulated carrier in an area adjacent to the specified read area. The RFID reader controls the RFID transmitter to transmit the modulated carrier during a preamble transmission of the RFID reader to prevent any RFID tags in the adjacent area from recognizing an interrogation signal from the RFID reader.

17 Claims, 4 Drawing Sheets

(56) References Cited

U.S. PATENT DOCUMENTS

| | | | |
|---|---|---|---|
| 2008/0129454 A1* | 6/2008 | Chen et al. | 340/10.1 |
| 2009/0258592 A1* | 10/2009 | Huang | 455/1 |
| 2010/0171594 A1 | 7/2010 | Bares | |
| 2011/0074582 A1* | 3/2011 | Alexis | 340/572.1 |
| 2011/0095087 A1* | 4/2011 | Master et al. | 235/385 |
| 2011/0095868 A1* | 4/2011 | Horne | 340/10.1 |
| 2011/0130085 A1 | 6/2011 | Bellows et al. | |
| 2011/0304434 A1* | 12/2011 | Kohli et al. | 340/10.1 |
| 2013/0200992 A1* | 8/2013 | Kim | 340/4.11 |
| 2013/0339221 A1* | 12/2013 | Gentelet et al. | 705/39 |
| 2014/0159869 A1* | 6/2014 | Zumsteg et al. | 340/10.1 |
| 2014/0266615 A1* | 9/2014 | Ouyang et al. | 340/10.1 |
| 2014/0266617 A1* | 9/2014 | Wilkinson | 340/10.1 |

\* cited by examiner

DEFINING A RADIO FREQUENCY IDENTIFICATION READ AREA

BACKGROUND

Radio Frequency Identification (RFID) systems have become common in commercial environments, such as a retail store for example. In a typical scenario, RFID reader energy is typically set at the maximum allowed effective isotropic radiated power (EIRP) to achieve the greatest penetration into shopping carts or other containers. This allows the RFID reader to read the greatest amount of RFID tags at the greatest range. However, there are some cases where it is desired to read RFID tags only within a specified read area without reading other RFID tags that may be near the specified read area.

For example, it may be desired to read all the items that are leaving the store, which can be useful for inventory management. In this case, RFID readers can be stationed at the store exit, with their associated antennas pointed into the area of interest, i.e. the store exit. This arrangement achieves robust RFID reads of the RFID tags leaving the store through the area of interest, although spillover into adjacent areas is usually a problem, where items that are near the exit, but not actually leaving the store, are accidentally read by the RFID reader. This results in an ambiguity of what actually passed through the intended read area. Even with careful antenna placement to avoid illuminating areas adjacent to the store exit, the reflections produced by people walking through the intended read area can cause unintentional energy to spill into non-read zones.

Similarly, it could be that other RFID readers that are being used near the exit in the store for normal stock maintenance could accidentally read RFID tags that are leaving the store, which will result in an inaccuracy of stock inventory in the store.

Accordingly, there is a need for a definitive technique to define a read area to record RFID tags passing through the defined read area, without capturing those RFID tags that are only near the read area but not passing through the read area. In the prior art this could be achieved by jamming the nearby tags or readers. However, jamming will not allow nearby tags to be read at all, which will prevent proper inventory management. Therefore, it would also be of benefit if those nearby tags adjacent to the defined read area could be properly read by other RFID readers in the normal course of business.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus and method is described that provides a definitive technique to record RFID tags passing through a defined read area, without capturing those RFID tags that are only near the read area but not passing through the read area. In this way, the present invention can robustly read RFID tags within a given area while not reading RFID tags in unintended areas. The present invention also allows nearby tags to be read by other RFID readers in the normal course of business.

The system described herein uses a wireless RFID air interface for communication with electronic RFID tags that may be affixed to, or embedded within, various different physical items, as is known in the art, and is used in the implementation of various embodiments of the present invention. RFID scanners and RFID tags are known to refer to a wide variety of business electronic platforms and can include other devices and functions, as are known in the art and therefore not shown for the sake of simplicity.

The system described herein can also include a wireless local area communication network, such as the various IEEE 802.11 wireless communication systems. However, it should be recognized that the present invention is also applicable to direct wiring and other wireless communication systems modified to implement embodiments of the present invention. It should be recognized that the wireless communication network can include many other network entities to provide communication services, but these known entities are not shown to simplify the drawings. Also, the protocols and messaging needed to establish a wireless communication network are known in the art and will not be presented here for the sake of brevity.

Various entities are adapted to support the inventive concepts of the embodiments of the present invention. Those skilled in the art will recognize that the figures do not depict all of the equipment necessary for network to operate but only those network components and logical entities particularly relevant to the description of embodiments herein. For example, components such as processors, communication interfaces, transceivers, RFID scanners, power supplies, memories, and RFID tags are well-known, and will not be described in detail herein for the sake of brevity. It should be recognized that processing units are known to comprise basic components such as, but not limited to, microprocessors, microcontrollers, memory, application-specific integrated circuits, and/or logic circuitry. Such components are typically adapted to implement algorithms and/or protocols that have been expressed using high-level design languages or descriptions, expressed using computer instructions, or expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components. It is within the contemplation of the invention that the operating requirements of the present invention can be implemented in a software processor (or a digital signal processor) in conjunction with firmware or hardware.

Figure 1:
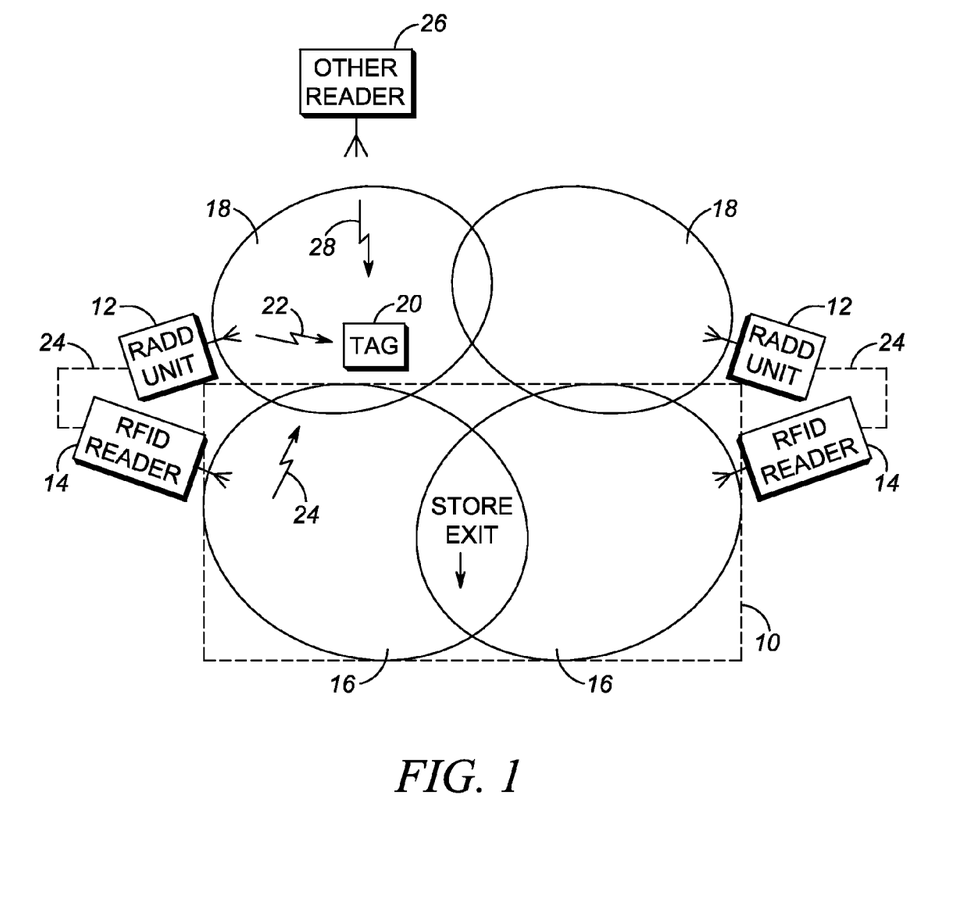
FIG. 1 is a simplified plan diagram of an RFID system, in accordance with the present invention.

FIG. 1 is a plan diagram depiction of a system to define a radio frequency identification (RFID) read area 10, in accordance with the present invention. At least one radio frequency identification (RFID) reader 14 is provided, and is operable to read RFID tags within a specified read area 10. At least one RFID Read Area Definition Device (RADD) unit 12 is coupled 24 with the at least one RFID reader 14. The RADD unit can be a dumb RFID transmitter or a fully functional RFID reader, and is operable to radiating a modulated carrier 22 in an area adjacent to the specified read area 10. Although two readers and two RADD units are shown, it could be that a single reader can be coupled to multiple RADD units, or that multiple readers can be coupled to each RADD unit.

The antennas of the RFID reader(s) 14 are pointed into the area of interest, as an example, a store exit, to provide read coverage 16 of any tags passing through the defined area 10. The RFID reader energy is typically set at the maximum allowed effective isotropic radiated power (EIRP) to achieve the greatest penetration of read coverage 16 into shopping carts or other containers. Even with careful antenna placement to avoid illuminating adjacent areas, tags 20 in the adjacent non-read zones 18, but not moving through the store exit (e.g. items at a checkout) could be accidentally read by the RFID readers. Therefore, the antennas of the RADD unit(s) 12 pointed into non-read areas 18 adjacent to the defined read area 10 to block, or interfere with, interrogations 24 by the readers 14.

In operation, at least one RFID reader 14 is operable to control at least one RADD unit 12 to transmit the modulated carrier 22 during a preamble transmission 24 of the RFID reader to prevent any RFID tags 20 in the adjacent area from recognizing an interrogation signal from the at least one RFID reader. As used herein the term "preamble" refers to an RFID protocol handshake period that can not only include the R→T (interrogator to tag) link preamble or frame-synch, but can also include the transmission of initial command parameters or R→T calibration signals, and the setting up of the interrogation round. It is beneficial in this regard to have the RADD unit(s) 12 time synchronized with the at least one RFID reader 14 so that the RADD unit will know when the reader will be broadcasting its preamble.

In the example described, the use of the modulated carrier 22 of the RADD unit 12 disrupts the RFID tag 20 and effectively blocks the interrogation 24 of the tag by the RFID reader 14 during a very short, but critical handshake period. In practice, the interference need only be sufficient to disrupt the edge timing in the preamble so that the tag cannot recognize the preamble, rendering the tag mute for further interrogation by the RFID reader during the read cycle. The modulated carrier 22 is stopped when the at least one RFID reader 14 is not sending the preamble transmission such that other RFID readers 26 in the adjacent area can interrogate the RFID tags 20 in the adjacent area.

Without the RADD units, unintended reads by the RFID readers may extend as much as fifty feet back into the store. However, with the RADD units, reads by the RFID readers are confined to the intended zone 10. In addition, other RFID readers 26 within the store can actually read into the protected RADD area 18 due to higher power flux densities from the antennas of the other readers 26 pointed into the RADD areas 18, and due to the other reader's 26 preamble being non-synchronous to the RADD readers.

In practice, the modulated carrier 22 is sent at a lower power than the interrogations signals 24, 28 of the at least one RFID reader 14 and other RFID readers 26. In particular, the RADD units can transmit at a relatively low EIRP using 9 dBiC antennas running at +24 dBm. In this case, the linearly measured EIRP is approximately 30 dBm. Due to this low power of the modulated carrier 22, it may be that higher power readers 26 could be able to read tags 20 during transmission of the modulated carrier.

The modulated carrier 24 can also be sent at a lower than readable carrier frequency for the interrogation signal. In particular, the RADD transmitters use 100% duty cycle binary phase shift keying (BPSK) or amplitude modulation (AM) at a 40 KHz rate within the industrial, scientific and medical (ISM) band, whereas interrogations typically take place at 250 kHz. Blocking the preamble of the reader is still possible using this lower frequency since RFID tags use a wideband RF detector. There is no preselection of the RF input other then the low Q antenna that the tag's chip is connected to. Any RADD energy, regardless of the frequency channel used, that is incident upon the tag that is greater than 12 dB below the reader energy will corrupt the tag's command downlink during the preamble, causing the tag to go mute. Because RFID tags are short range devices, and the RADD energy is much lower than RFID energy, the effective blocking range of RADD is very limited.

The RADD units have non-synchronous channel hopping to one another, and are randomly hopping within the ISM band according to FCC 15.247. Therefore, an on-channel collision could be observed, similar to any other RFID reader. However, since the carrier modulation rate is 40 kHz, and RFID tag responses are typically at 250 kHz or greater, the RADD modulation is filtered very heavily by the base band of the RFID readers. In particular, the uplink and downlink frequencies for an RFID tag are different frequencies. Therefore, on-channel transmissions of the modulated carrier should not affect tags in the defined area. Off channel, the RADD energy is out of band to any other reader with no significant effects other then the local RADD effect upon the tags.

As a result, all RADD unit radiating parameters are compliant with FCC 15.247, and the effects upon non-RFID ISM devices are similar to any ISM hopping device.

The present invention also provides mitigation strategies to reduce the modulated carrier effects upon the other RFID readers 26. Firstly, under extreme reader density conditions, the RADD transmitters can be time synchronized with the RFID readers they are zone defining. A reader duty cycle can be applied. Therefore, RADD energy will only be present when the zone defined readers are radiating. The above time synchronized strategy can be applied with Listen Before Talk (LBT) readers they are zone defining.

Yet another layer of system protection from RADD energy can be for the RADD transmitters to only turn on during the zone protected reader's R→T link preamble. This will still be effective to define the read zones, yet will be less obtrusive to other RFID readers due to: much lower power on duty cycles of the modulated carrier (which is only on approximately 1% of the time), lower power flux densities (which use a directional antenna and at lower power to effect only targeted tags), and random channel hopping (where only one channel out of many is interfered with). As a result, only RADD synchronized readers will be affected, where non-RADD readers will not see a significant impact by the present invention and will be able to fully read into RADD protected areas. In particular, a RADD transmitter using the above mitigation strategies will have significantly less impact upon other ISM devices and non-zone protected (non-synchronized) readers then a normal RFID reader.

In effect, the present invention provides selective blocking of signals in synchronized devices, and only during specific times. Normal store readers are asynchronous and therefore still will be able to read tags near the defined area 98-99% of the time. Also, the present invention is not only applicable to RFID signals, but can also be used to block UHF frequencies or Electronic Product Code™ (EPC) generation 2 signals.

The present invention can use its signal blocking in order to provide a locationing function. For example, tags that are blocked at one moment in a zone and can then be read at another moment in that zone are then known to be located within that zone. Further, the present invention can also sequence signal blocking in multiple read zones having RADD coverage in order to provide a finer locationing function, i.e. tags can be located in one of multiple smaller subdivided zones instead of only one large zone. In particular, the present invention can create a moving read zone raster using an array of RADD units, where if tags disappear when blocked, by definition they must be in that area. In this way, the present invention can be used to inventory unblocked tags in each zone, which also results in less collisions for smaller tag populations.

The present invention can define read zones using different configurations of RFID device antennas. In practice, omnidirectional, directional, or a phased array of antennas could be use for defining the area to be protected. In addition, a distributed antenna system could be use to create a cost effective antenna grid, where a single reader can control RADD transmitters across a larger area. The distributed antenna system could be built into the walls, ceilings or window framing of a structure. Further, the modulated carrier can be sent at different antenna polarizations to subdivide tag populations based on those polarizations.

The present invention can use RADD unit frequencies that cannot be read by the RFID readers. For example, the 40 kHz RADD modulation frequency can still block tags with wideband reception, but the narrower-band 250 kHz RFID readers will not read the RADD frequencies, thereby avoiding collision problems while also reducing the spectral loading of the ISM band. The RADD units can also use frequency hopping, which is pseudo random and non-synchronized between different RADD units.

The RADD units of the present invention can include full RFID reader functionality. As a result, the RADD units and RFID readers could exchange their functions, where the area adjacent to the defined read area becomes a newly defined read area, and where the old defined read area becomes the area where tags are blocked, i.e. where tag interrogation is prevented. Alternatively, the RADD unit can be used to prevent tag interrogation for a first period and perform an inventory round of tags in the adjacent area during a second time period.

The modulated carrier need not be a simple carrier wave, but can also include information such as an identity of the particular RADD unit. In this way, a RFID reader could learn timing information from the modulated carrier along with an identity of the RADD unit sending that modulated carrier. This information can be used to provide synchronization corrections to the particular identified RADD unit, where the synchronization corrections could be provided to the RADD unit in an identity burst of the RFID reader. Alternatively, this identity information could be used to coordinate modulated carrier transmissions. For example, multiple RADD units could be coordinated to transmit their carrier at different times, or all RADD units can be controlled to transmit their carrier at only at every other opportunity.

In the present invention, a location of a tag can be determined by its failure to return an interrogation signal in the adjacent area during the transmission of the modulated carrier and its proper returning of the interrogation signal in the adjacent area after the transmission of the modulated carrier. Similarly, movement of a RADD unit outside of the adjacent area can be determined by a tag's failure to return an interrogation signal in the adjacent area during the transmission of the modulated carrier and then the tag's proper returning of the interrogation signal in the adjacent area during a subsequent transmission of the modulated carrier. Further, a movement of a tag outside of the adjacent area can be determined by its failure to return an interrogation signal in the adjacent area either during or after the transmission of the modulated carrier. In addition, a location of a tag can be determined by its failure to return an interrogation signal in the adjacent area during the transmission of the modulated carrier and its proper returning of the interrogation signal in the adjacent area during a subsequent transmission of the modulated carrier at a lower power, indicating that the tag is located within those two power ranges.

In an alternative embodiment, time slots can be assigned for each tag and the modulated carrier could be sent during these time slots to prevent the reading of that tag. Alternatively, the tag could be allowed to respond to an interrogation, wherein the RFID reader can hears the tag's response during time slot, whereupon the reader can then send acknowledgement. However, the RADD unit can then send the modulated carrier during that acknowledgment, thereby preventing the completion of the interrogation.

Advantageously, in any of the above scenarios, the RADD units are fully FCC Rule 15.247 compliant and maintain the FCC and EPC channel and band masks. This is because the RADD units are typically lower power than normal RFID transmitters by several dB. Also, the RADD units pseudo-randomly hop, and are not frequency coherent to any other ISM device, reducing the spectral load on the ISM band. The preamble that is blocked is a small portion of the overall RFID EPC gen 2 protocol. The power on duty cycle is a small fraction of an RFID reader. Since the time synchronized jammers have a much lower modulating and power on duty cycle then the RFID readers, they will have a substantially lower spectral load then the RFID readers they are replacing. Also, they will not have as significant on-channel impact due to the very low duty cycle used. A non-synchronous reader reading tags on a particular channel may lose a single tag during the modulated carrier burst, but that tag will rejoin subsequent rounds. All other tags in the round are unaffected, whereas a normal RFID reader may collide the entire round. The off-channel effect of the modulated carrier is purely local to the RADD unit and the tags in range of the RADD unit. During any on-channel collision between any RADD unit and the reader, the reader can use that time to resynchronize to the colliding RADD unit. In addition, the reader will have foreknowledge of the collision event because it has the RADD units hop lists.

Figure 2:
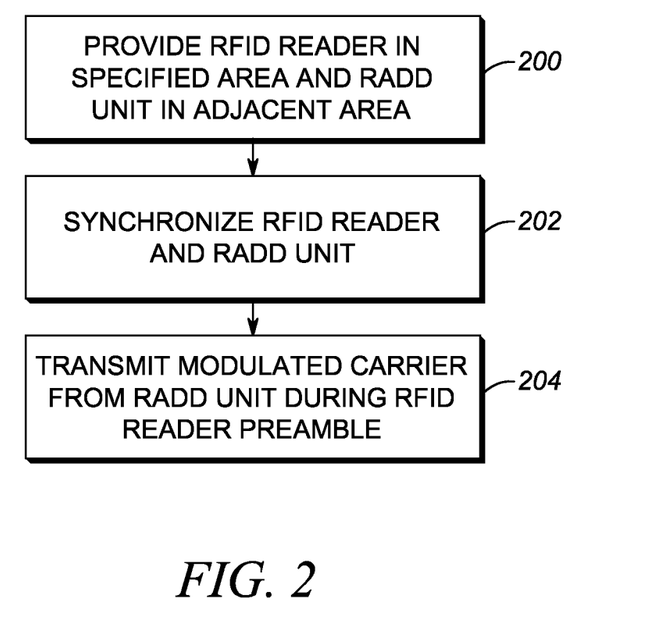
FIG. 2 is a flowchart of a method, in accordance with one embodiment of the present invention.

FIG. 2 describes a first embodiment for a method to define an RFID read area, in accordance with the present invention. The method includes a first step 200 of providing at least one radio frequency identification (RFID) reader operable to read RFID tags within a specified read area and at least one RFID transmitter coupled with the at least one RFID reader. The coupling can be through a wired or wireless connection. For example, the General Purpose Input/Output (GPIO) ports of the RFID reader(s) can be wired to the GPIO ports of the RADD unit(s). Alternatively, the coupling can be made wirelessly through a local area network, either directly between the reader and RADD units or via a network controller.

A next step 202 includes the RFID reader time synchronizing the at least one RADD unit to the at least one RFID reader. The time synchronizing can be used by the reader(s) to notify the RADD unit(s) when the reader(s) preamble transmission will start and end. Again, this can be accomplished through a wired (e.g. GPIO) interface, or wireless network.

A next step 204 includes controlling the at least one RFID transmitter to radiating a modulated carrier in an area adjacent to the specified read area during a preamble transmission of the RFID reader to prevent any RFID tags in the adjacent area from recognizing an interrogation signal from the at least one RFID reader. Again, this can be accomplished through a wired interface (e.g. the RADD unit broadcasts until the GPIO line is released), or via control signals over a wireless network.

In this simple embodiment, no wireless network connectivity is required of the RADD units, and a wired connection could be used to save costs. Also, the RADD unit need be only a dumb transmitter controlled by the RFID reader.

Figure 3:
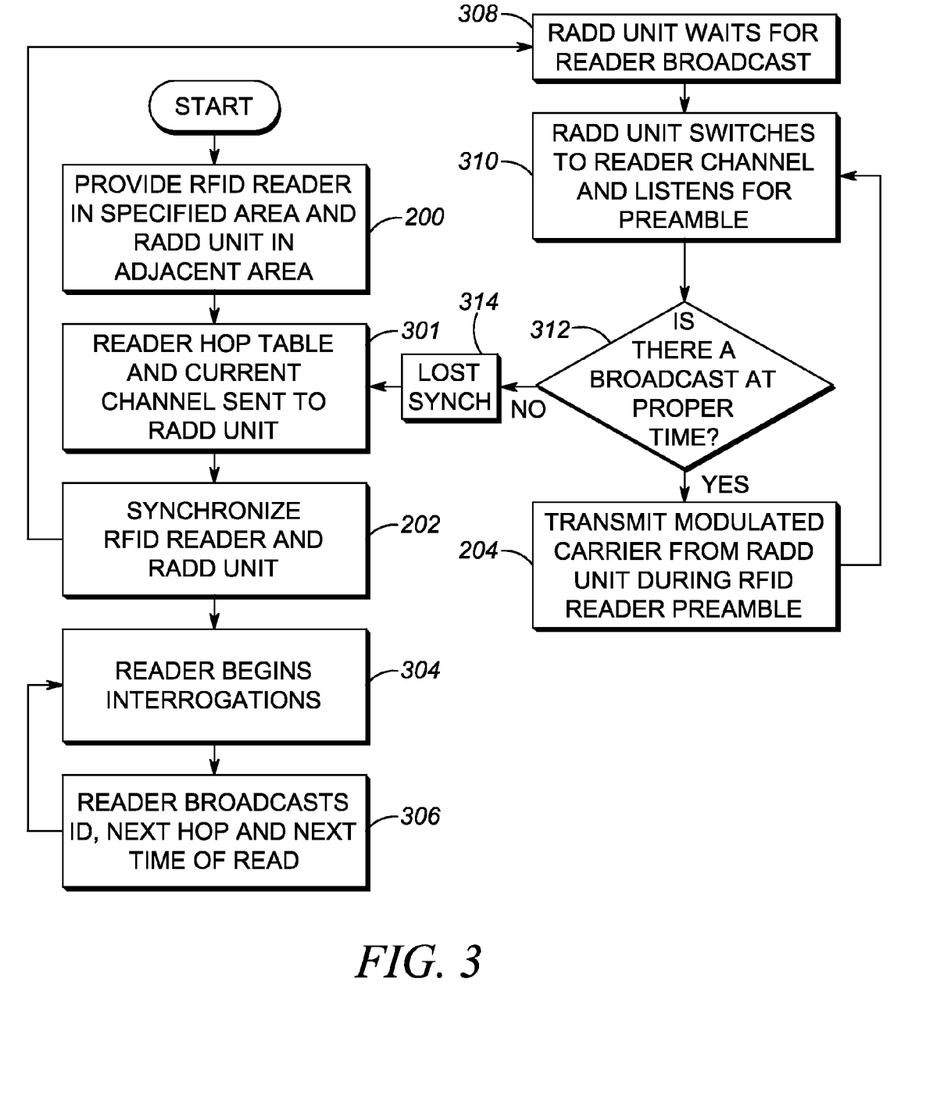
FIG. 3 is a flowchart of a method, in accordance with another embodiment of the present invention.

FIG. 3 describes another embodiment for a method to define an RFID read area, in accordance with the present invention. This embodiment relies upon wireless network connections and RF signaling. As before, the method includes a first step 200 of providing at least one radio frequency identification (RFID) reader operable to read RFID tags within a specified read area and at least one RFID transmitter coupled with the at least one RFID reader. In this embodiment, the coupling is through a wireless connection, such as through a local or wide area network, where the coupling can be made directly between the reader and RADD units or via a network controller. In this way the reader can command the RADD unit associated therewith.

A next step 301 includes the RFID reader communicating its scheduled hop table and current operating frequency channel is to the RADD units through the wireless network.

A next step 202 includes the RFID reader time synchronizing the at least one RADD unit to the at least one RFID reader. The time synchronizing can be used by the reader(s) to notify the RADD unit(s) when the reader(s) preamble transmission will start and end. Again, this can be accomplished through the wireless network.

At this point, the RADD unit can start waiting 308 for the anticipated time of an RFID reader broadcast, while the RFID reader can begin reading (i.e. begin tag interrogations).

The RADD unit switches 310 to the RFID reader's current frequency channel and listens for the preamble. The RADD unit can also determine if the RFID reader is broadcasting channel hop information. For example, when the RFID reader finishes it's time on the current frequency channel, it can broadcasting it's reader ID, the next hop channel it will use according to it's hop list, and an anticipated time of the next read (i.e. interrogation). If the RADD unit detects this broadcast, the RADD unit switches 310 to the RFID reader's new frequency channel and listens for the preamble on the new channel.

If the RADD unit does not detect the preamble 312 at the proper time, it can be assumed that it has lost synchronization, whereupon the network will be notified 314, and the RADD unit will again 301 obtain the reader's hop table and current channel, and re-synchronize 202.

If the RADD unit detects the preamble, then the RADD unit will radiating 204 a modulated carrier in an area adjacent to the specified read area during the preamble transmission of the RFID reader for long enough to ensure preamble corruption to prevent any RFID tags in the adjacent area from recognizing an interrogation signal from the at least one RFID reader.

In this embodiment, the RADD unit(s) would need to be a very fast channel hopper. The loss of synchronization could cause a variable delay due to the network. Therefore, the tag data could be parsed during the delay if it is short enough. The RADD units would have a very low wireless network load, and only during loss of synchronization events.

Figure 4:
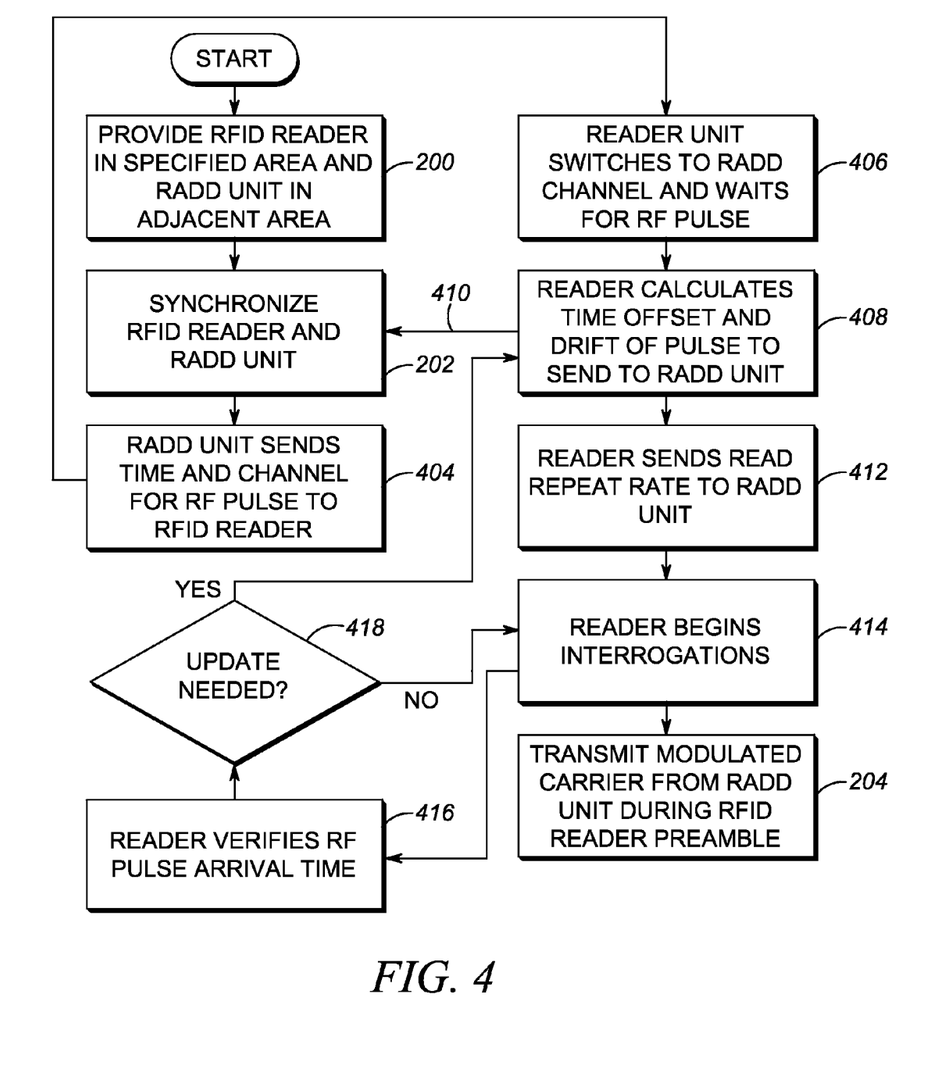
FIG. 4 is a flowchart of a method, in accordance with yet another embodiment of the present invention.

FIG. 4 describes yet another embodiment for a method to define an RFID read area, in accordance with the present invention. This embodiment also relies upon wireless network connections and RF signaling. As before, the method includes a first step 200 of providing at least one radio frequency identification (RFID) reader operable to read RFID tags within a specified read area and at least one RFID transmitter coupled with the at least one RFID reader. The coupling can be through a wired or wireless connection. The RADD units can be low-cost dumb transmitters with network connectivity. Either wired, such as perhaps a Power Over Ethernet connection or wireless, such as through a local or wide area network, where the coupling can be made directly between the reader and RADD units or via a network controller. In this way the reader can command the RADD unit associated therewith.

A next step 202 includes the RFID reader time synchronizing the at least one RADD unit to the at least one RFID reader. This step provides a coarse frequency correction. The time synchronizing can be used by the reader(s) to notify the RADD unit(s) when the reader(s) preamble transmission will start and end. Again, this can be accomplished through the wireless network. This step includes the RADD unit sending it hop list to the RFID reader, which can be done between the devices or through the wireless network.

A next step 404 includes the RADD unit sending a time and frequency channel on which the RADD unit will send an RF timing pulse to the RFID reader.

A next step 406 includes the RFID reader switching its channel to the RADD channel being measured and awaits arrival of the RF pulse.

A next step 408 includes the RFID reader time stamping the arrival of each RADD RF pulse and calculating the time offset to provide a finer time correction to the RADD unit for time correction. Steps 202, 404 and 406 can be looped 410 in order to determine a clock drift rate to send to the RADD unit and to verify timing accuracy.

A next step 412 includes the RFID reader sending its interrogation (read) repeat rate to the RADD unit through the network.

A next step 414 includes the RFID reader beginning it interrogations at the prescribed rate from step 412.

A next step 204 includes the RADD unit radiating a modulated carrier in an area adjacent to the specified read area during the preamble transmission at the anticipated time of the RFID reader broadcast for long enough to ensure preamble corruption to prevent any RFID tags in the adjacent area from recognizing an interrogation signal from the at least one RFID reader.

Optionally, a next step 416 includes the RFID reader verifying the arrival time of the pulse of each of the RADD units. This can be performed during a collision or by having the RFID reader occasionally dropping a read cycle and switching to the RADD channel to determine the pulse timing.

If the verification step 416 determines that the accuracy is off and a timing update is needed 418 then the calibration cycle starting at step 408 is repeated. Otherwise, reader interrogations 414 continue.

In this embodiment, the RADD pulse timing accuracy is measured and corrected by the reader. After enough time has elapsed, the reader can also send drift rate correction data to the RADDs. Once scheduled reading has commenced, the reader can occasionally miss a read event to check the RADD timing. This will occur at low tag read times when the reader is not busy. Alternatively, the reader can check RADD timing during a collision event, where the reader listens to RADD unit burst, which can include the RADD identification, such that the reader can identify the particular RADD unit and its timing. Reader interrogations and hence RADD pulses are scheduled at regular intervals. An additional RADD pulse can be added just prior to reading to verify timing accuracy. Interrogation repetition rates can be as short as 40 ms. If a read cycle is not yet complete, the RADDS will burst on schedule with no read impact within the preferred read zone. Since the tag population is being limited by the jamming, the Q values of the reader can be reduced to speed up reads in the read zones.

Advantageously, the apparatus and method described herein enables accurate RFID coverage of a defined read area, which results in more accurate inventory management. The present invention is not a simple jamming technique, which can prevent normal RFID operations outside of the defined read area, but uses preamble blocking to effect the solution without compromising the reading of other tags by other RFID readers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for defining a radio frequency identification read area, the system comprising:
at least one radio frequency identification (RFID) reader operable to read RFID tags within a specified read area;

at least one RFID transmitter coupled with the at least one RFID reader, the at least one RFID transmitter operable to radiating a modulated carrier in an area adjacent to the specified read area;

wherein the at least one RFID reader is operable to control the at least one RFID transmitter to transmit the modulated carrier only during a preamble transmission of the at least one RFID reader to prevent any RFID tags in the adjacent area from recognizing an interrogation signal from the at least one RFID reader; wherein the preamble transmission of the at least one RFID reader comprises an RFID protocol handshake period, initial command parameter, or calibration signals for setting up of an interrogation round.

2. The system of claim 1, wherein the modulated carrier is stopped when the at least one RFID reader is not sending the preamble transmission such that other RFID readers in the adjacent area can interrogate the RFID tags in the adjacent area.

3. The system of claim 1, wherein the modulated carrier is sent at a lower frequency than readable carrier frequency for the interrogation signal.

4. The system of claim 1, wherein the modulated carrier is sent at a lower power than the interrogations signals of the at least one RFID reader and other RFID readers.

5. The system of claim 1, wherein the at least one RFID transmitter is time synchronized with the at least one RFID reader.

6. The system of claim 5, wherein the modulated carrier includes identity information of the at least one RFID transmitter, and wherein the at least one RFID reader is operable to learn timing information from the modulated carrier along with an identity of the at least one RFID transmitter and to provide synchronization corrections to the at least one RFID transmitter.

7. The system of claim 6, wherein the at least one RFID reader is operable to send synchronization corrections to the at least one RFID transmitter in its own identity burst.

8. The system of claim 1, wherein the at least one RFID transmitter also include full RFID reader functionality to interrogate RFID tags normally.

9. The system of claim 7, wherein the at least one RFID transmitter and at least one RFID reader are operable to exchange their functions, where the area adjacent to the specified read area becomes a newly specified read area, and where the old specified read area becomes the area where tag interrogation is prevented.

10. The system of claim 7, wherein the at least one RFID transmitter is operable to be used to prevent tag interrogation for a first period and perform an inventory round of tags in the adjacent area during a second time period.

11. The system of claim 1, wherein the at least one RFID transmitter is operable to use frequency hopping that is non-synchronized between different RFID transmitters.

12. The system of claim 1, wherein a location of a tag can be determined by its failure to return an interrogation signal in the adjacent area during the transmission of the modulated carrier and its proper returning of the interrogation signal in the adjacent area after the transmission of the modulated carrier.

13. The system of claim 1, wherein a movement of a tag outside of the adjacent area can be determined by its failure to return an interrogation signal in the adjacent area either during or after the transmission of the modulated carrier.

14. The system of claim 1, wherein a movement of the at least one RFID transmitter is determined by a tag's failure to return the interrogation signal from the at least one RFID reader in the adjacent area during the transmission of the modulated carrier and then the tag's proper returning of the interrogation signal in the adjacent area during a subsequent transmission of the modulated carrier.

15. The system of claim 1, wherein a location of a tag can be determined by its failure to return the interrogation signal in the adjacent area during the transmission of the modulated carrier and its proper returning of the interrogation signal in the adjacent area during a subsequent transmission of the modulated carrier at a lower power.

16. The system of claim 1, wherein the modulated carrier is sent at different antenna polarizations.

17. A method for defining a radio frequency identification read area, the method comprising:

providing at least one radio frequency identification (RFID) reader operable to read RFID tags within a specified read area and at least one RFID transmitter coupled with the at least one RFID reader;

time synchronizing the at least one RFID transmitter to the at least one RFID reader; and controlling the at least one RFID transmitter to radiating a modulated carrier in an area adjacent to the specified read area only during a preamble transmission of the at least one RFID reader to prevent any RFID tags in the adjacent area from recognizing an interrogation signal from the at least one RFID reader; wherein the preamble transmission of the at least one RFID reader comprises an RFID protocol handshake period, initial command parameter, or calibration signals for setting up of an interrogation round.

* * * * *